United States Patent [19]
Marshall et al.

[11] Patent Number: 5,083,463
[45] Date of Patent: Jan. 28, 1992

[54] ROTATABLE VIBRATION TEST APPARATUS

[75] Inventors: Philip Marshall, Lexington; Paul Ford, Maynard, both of Mass.

[73] Assignee: M/RAD Corporation, Woburn, Mass.

[21] Appl. No.: 476,175

[22] Filed: Feb. 7, 1990

[51] Int. Cl.$^5$ .......................... G01N 29/00; B06B 3/00
[52] U.S. Cl. ...................................................... 73/663
[58] Field of Search ................. 73/662, 663, 666, 665, 73/668

[56] References Cited
FOREIGN PATENT DOCUMENTS

0010142  1/1985  Japan ..................................... 73/663
1381355  3/1988  U.S.S.R. ............................... 73/663

Primary Examiner—Hezron E. Williams
Assistant Examiner—Rose M. Finley
Attorney, Agent, or Firm—Pandiscio & Pandiscio

[57] ABSTRACT

A vibration test fixture assembly for releasably securing a test object to the top surface of a sliptable and for rotatably supporting the test object so that the test object can be repositioned between vibration tests without detaching the test object from the fixture. The assembly comprises a bottom plate, a top plate positioned on top of the bottom plate, and a plurality of spring-loaded bearing assemblies between the top and bottom plates for permitting the top plate to rotate relative to the bottom plate except when a downward force of sufficient magnitude to overcome the spring bias of the bearing assemblies is applied to the top plate. The assembly also comprises a plurality of clamps positioned adjacent the top plate for applying a downward force to the top plate sufficient to overcome the spring bias of the bearing assemblies and cause the top plate to engage the bottom plate. The test object is secured to the top plate and the bottom plate is secured to the top surface of a sliptable.

22 Claims, 4 Drawing Sheets

ROTATABLE VIBRATION TEST APPARATUS

FIELD OF THE INVENTION

The present invention relates to vibration test apparatus, and more particularly to fixtures for releasably coupling a test object to a sliptable so as to permit the test object to be selectively positioned relative to the sliptable.

BACKGROUND OF THE INVENTION

The development and/or manufacture of various products, such as circuit boards for a computer, frequently includes vibration testing. Such testing is needed to determine if the product can withstand vibration forces of the type expected to be encountered during use of the product.

Conventional vibration testing typically involves attaching the test object to the top surface of a shaker table or a sliptable coupled to a shaker table and then activating the shaker table for a suitable period of time. Since it is frequently desirable to vibration test an object along two or more of its axes, in the past it has been necessary to reposition the test object after each vibration test so as to align the various axes of interest of the object in selected relationship with the axis of the vibration force generated by the shaker table. The time and cost of vibration testing an object is increased significantly when the object must be repositioned for every axis along which the object is to be vibration tested.

In an attempt to minimize the time associated with repositioning an object to be vibration tested along three mutually-orthogonal axes thereof, Marshall et al. developed an apparatus for automatically repositioning a test object, as disclosed in U.S. Pat. No. 4,848,160, issued July 18, 1989. The latter apparatus comprises a cubic fixture for supporting an object to be vibration tested, a head expander positioned between the cubic fixture and a vibration source, an index assembly for raising the cubic fixture away from and lowering the cubic fixture onto the head expander, and a rotation assembly for rotating the cubic fixture about its diagonal axis when the fixture is raised above the head expander. The apparatus also includes a controller for automatically raising, rotating and lowering the cubic fixture so that vibration testing can be performed along three mutually-orthogonal axes of the test object without detaching the object or the cubic fixture on which it is supported from the vibration source during the three-test sequence.

Although the Marshall et al. apparatus functions satisfactorily when it is desired to vibration test an object along three mutually-orthogonal axes thereof, the apparatus tends to be complex, and is hence more costly than is required when it is desired to vibration test an object along axes lying in a single plane. As such, the cost of performing the latter vibration tests tends to be more involved and expensive than necessary. Additionally, the Marshall et al. apparatus is limited in that the test object must be detached from the cubic fixture and repositioned if it is desired to vibration test the object along axes other than the three mutually-orthogonal axes of the object along which vibration testing was first performed.

To overcome some of the above-listed limitations of the apparatus disclosed in U.S. Pat. No. 4,848,160 to Marshall et al., a test fixture was developed for translating a single vibration force into three equal vibration forces which extend along three mutually-orthogonal axes and for applying the forces to a test object so that each of the forces extends parallel to a corresponding-respective one of three mutually-orthogonal axes of the object, as disclosed in U.S. patent application Ser. No. 362,757, filed June 7, 1989 in the name of Philip Marshall (the '757 application). The fixture disclosed in the '757 application comprises an inclined top plate for supporting a test object in selected angular relationship relative to a shaker table or sliptable, and a base for securing the top plate to the shaker table or sliptable.

Although the fixture disclosed in the '757 application functions satisfactorily, the latter fixture permits an object to be vibration tested along only two axes lying in a given plane of the object. The test object must be detached from the fixture, repositioned, and reattached to the fixture if it is desired to vibration test the object along more than two axes in a given plane. This characteristic of the fixture of the '757 application can be limiting when it is desired to perform more than two vibration tests in a given plane of a test object without detaching the object from the support fixture to which it is attached.

OBJECTS AND SUMMARY OF THE INVENTION

One object of the present invention is to provide a fixture for rotatably supporting a test object on the surface of a sliptable so as to permit the object to be quickly and easily moved between one or more positions in a plane extending parallel to the surface of the sliptable without detaching the object from the fixture.

Another object of the present invention is to provide a fixture for attaching a test object to the surface of a sliptable, which fixture permits the test object to be rotated about an axis extending perpendicular to the surface of the sliptable between vibration tests, whereby the test object can be positioned in a selected test position.

These and other objects are achieved by a fixture comprising a bottom plate, a top plate, and a plurality of clamps. The bottom plate is adapted to be attached to the top surface of a sliptable and includes a plurality of spring-loaded bearings each (a) radially spaced a predetermined distance from the center of the bottom plate and (b) spaced a predetermined angular (e.g., 45°) distance from adjacent bearings. The bearings are designed and positioned so that when the bearings are in a predetermined retracted position, no portion thereof projects above the flat top surface of the bottom plate. The bottom plate includes a pin attached in the center thereof and sized so as to project from the top surface of the bottom plate.

The top plate includes a flat bottom surface having a bearing race which preferably includes a plurality of depressions formed therein. The number, size and placement of the depressions corresponds to the number, size, and placement of the bearings in the bottom plate, so that when the bottom surface of the top plate is positioned adjacent the top surface of the bottom plate, each of the bearings may be received in a corresponding respective depression. The top plate includes a central aperture sized to receive the pin attached to the bottom plate so that the pin makes a close axial and rotational sliding fit in the central aperture. The top plate also includes a plurality of hardened seats positioned about the peripheral edge thereof.

The clamps, which are preferably hydraulic, are attached to the top surface of the sliptable adjacent the peripheral edge of the top plate. The clamps include a projecting finger which is sized to engage the hardened seats in the top plate.

When the clamps are actuated, they force the top plate against the bottom plate, thereby forcing the bearings into their seats so that the top surface of the bottom plate engages the bottom surface of the top plate. When the hydraulic clamps are released, the spring-loaded bearings project slightly from the top surface of the bottom plate, thereby forcing the top plate away from the bottom plate. Then the top plate, and the test object secured to the top surface thereof, can be rotated relative to the bottom plate.

Other objects of the invention will in part be obvious and will in part appear hereinafter. The invention accordingly comprises the apparatus possessing the construction, combination of elements, and arrangement of parts which are exemplified in the following detailed disclosure. The scope of the present invention will be indicated in the claims.

BRIEF DESCRIPTION OF THE DRAWINGS

For a fuller understanding of the nature and objects of the present invention, reference should be made to the following detailed description taken in connection with the accompanying drawings wherein.

DETAILED DESCRIPTION OF THE INVENTION

Figure 1:
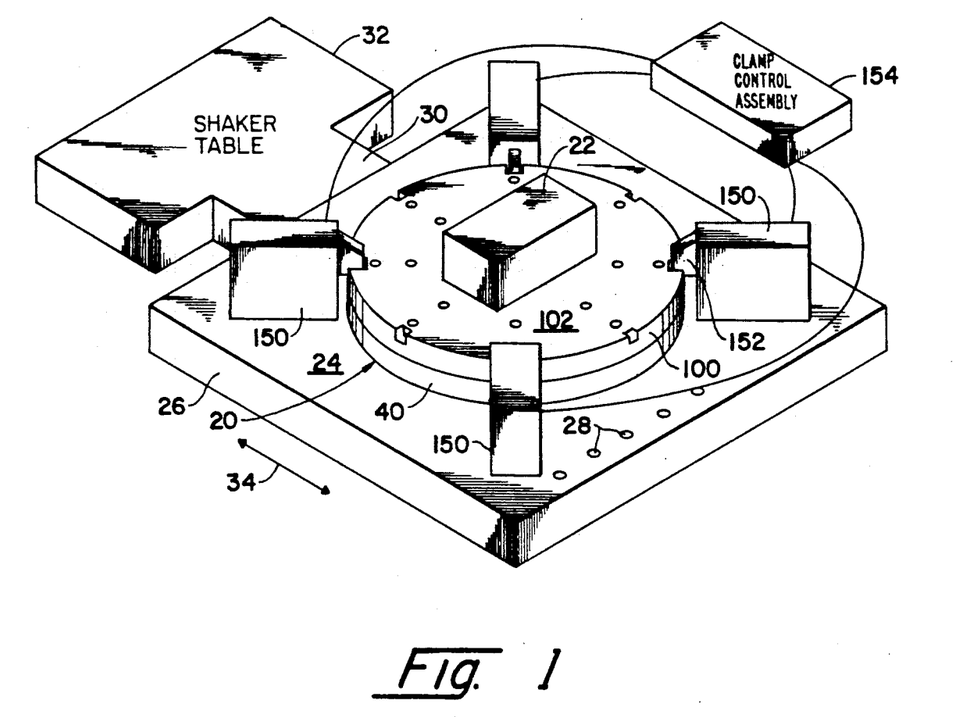
FIG. 1 is a perspective view of the test fixture assembly of the present invention, and a schematic perspective view of the sliptable and shaker table used with the test fixture.

Referring to FIG. 1, the present invention is a fixture assembly 20 for securing a test object 22 to the top surface 24 of a conventional sliptable 26, and for permitting the test object to be rotated about an axis extending perpendicular to the top surface of the sliptable without detaching the object from the fixture. Sliptable 26 includes a plurality of threaded bores 28 for use in bolting test objects to the surface thereof. As is known, sliptables are typically attached to the shaker head 30 of a conventional shaker table 32, whereby the vibration force generated by the shaker table is transmitted to the sliptable. This transmission causes the sliptable to move back and forth along an axis extending parallel to the top surface of the sliptable, as illustrated by arrow 34.

Figure 2:
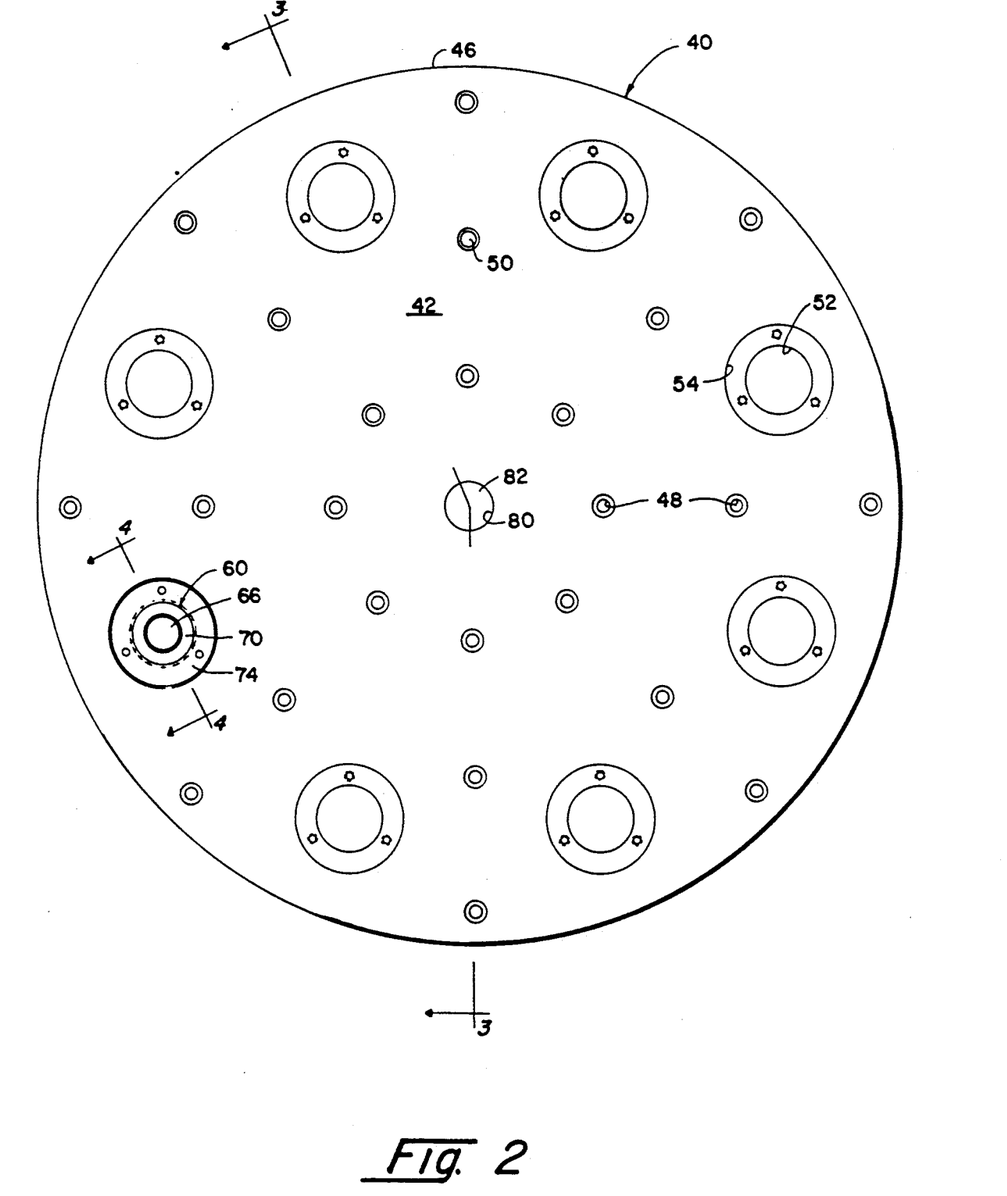
FIG. 2 is a plan view of the top surface of the bottom plate of the fixture.
Figure 3:
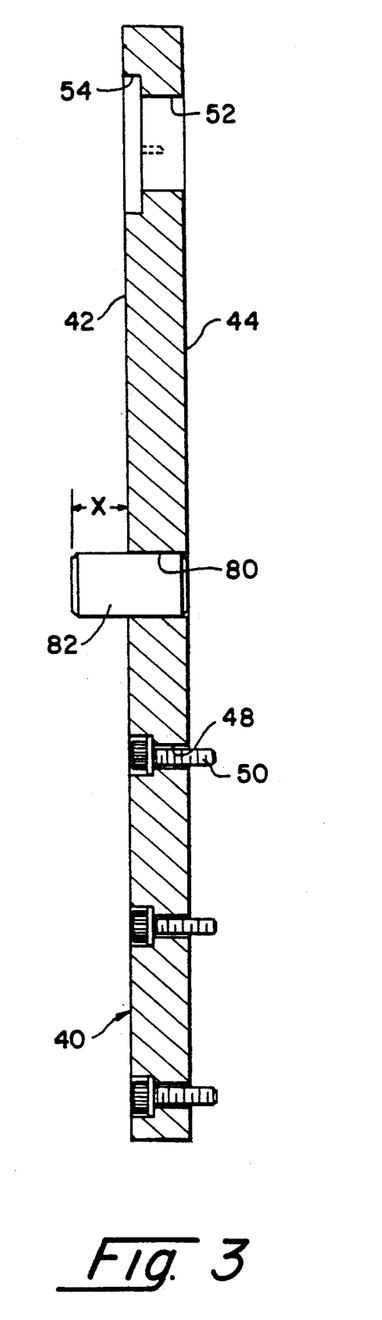
FIG. 3 is a section view of the bottom plate taken along line 3—3 in FIG. 2.

Referring now to FIGS. 1–4, fixture assembly 20 comprises a bottom plate 40 having a flat top surface 42 and a parallel flat bottom surface 44 (FIG. 3). Preferably, bottom plate 40 has a circular configuration, with the diameter of the plate, as measured between diametrically-opposed portions on the peripheral edge 46 of the plate, being selected based on the size of the test object. In an exemplary embodiment of fixture assembly 20, bottom plate 40 is made from magnesium plate having a thickness of about 1.5" and a diameter of about 26".

Bottom plate 40 includes a plurality of counterbored apertures 48 extending therethrough. The placement of apertures 48 is selected to correspond to the placement of threaded bores 28 in the top surface 24 of sliptable 26. Apertures 48 are sized to receive screws 50 (FIG. 3) which are used to secure the bottom plate 40 to the top surface 24 of sliptable 26. The heads of screws 50 sit in the counterbored apertures and are flush with or sit slightly below surface 42 of plate 40, as shown in FIG. 3.

Bottom plate 40 also includes a plurality of large-diameter bores 52 positioned a predetermined radial distance from the center of the bottom plate. Each bore 52 is spaced a predetermined angular distance from adjacent bores. The specific angular spacing between adjacent bores 52 is a function of the total number of bores. Thus, in an exemplary embodiment of fixture system 20, eight bores 52 are provided in bottom plate 40, with each bore being spaced 45° from adjacent bores. Each bore 52 includes a counterbore 54 which communicates with top surface 42.

Figure 4:
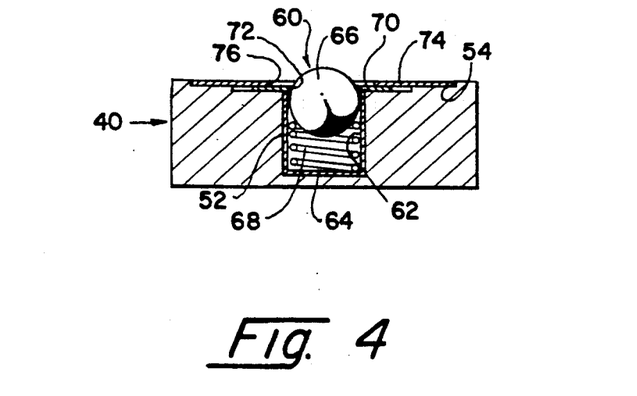
FIG. 4 is a section view of the bearing race of the bottom plate taken along line 4—4 in FIG. 2.

Referring now to FIGS. 2 and 4, bottom plate 40 additionally comprises a plurality of bearing assemblies 60, each being mounted in a corresponding respective bore 52. For clarity of illustration, however, only one bearing assembly 60 is shown in FIG. 2. As illustrated in FIG. 4, each bearing assembly 60 comprises a sleeve 62 which is sized for receipt in bore 52 with an interference fit. Sleeve 62 includes a blind end 64. A ball bearing 66 is positioned in each sleeve 62, and a compression spring 68 is disposed in sleeve 62 between ball bearing 66 and blind end 64 of the sleeve. Bearing assembly 60 also includes a bearing retaining ring 70 which is attached to the top end of sleeve 62. Retaining ring 70 includes a central bore 72 having a diameter which is slightly less than the outside diameter of ball bearing 66. As a result of this sizing and arrangement of the components of bearing assembly 60, ball bearing 66 is urged by spring 68 through central bore 72 in retaining ring 70 until portions of the outside surface of ball 66 adjacent the hemisphere thereof engage the wall of central bore 72. As a result of this captivation of ball 66 in sleeve 62, slightly less than half of ball bearing 66 may be caused to project through central bore 72 in retaining ring 70 under the bias of spring 68.

Bearing assembly 60 is retained in bore 52 by a flat washer 74 which has a central bore 76 having a diameter which is less than the outside diameter of retaining ring 70. The outside diameter of washer 74 is slightly less than the diameter of counterbore 54, whereby the washer can be received in the counterbore. After bearing assembly 60 is installed in bore 52, washer 74 is positioned in counterbore 54 and is bolted to the bottom of the counterbore, whereby bearing assembly 60 is captivated in bore 52. Counterbore 54 is relatively shallow and retaining ring 70 and washer 74 are relatively thin, with the result that ball bearing 66 projects slightly past top surface 42 under the bias of spring 68.

Bottom plate 40 further comprises a central bore 80 in which a pin 82 is secured by a press-fit or other suitable means. Pin 82 is sized so that a predetermined portion thereof (length X in FIG. 3) projects above top surface 42 of bottom plate 40.

Fixture assembly 20 also includes top plate 100 which has a flat top surface 102 (FIG. 6) and a parallel flat bottom surface 104. The size and configuration of top plate 100 preferably corresponds to that of bottom plate 40. For instance, in an exemplary embodiment of fixture assembly 20 where bottom plate 40 is circular and has a diameter of about 26", top plate is circular, has a diameter of about 26", as measured between diametrically-opposed portions on the peripheral edge 106 of the top plate. The thickness of top plate 100 is approximately equal to or slightly greater than the distance X of pin 82 that projects above top surface 42 of bottom plate 40. In an exemplary embodiment of the fixture assembly 20, plate 100 has a thickness of 2" and pin 82 projects about 1.95 inches above bottom plate 40.

Top plate 100 includes a plurality of threaded bores 108 (FIG. 6) communicating with top surface 102 for use in attaching a test object 22 to the top surface, as discussed hereinafter. A central bore 110 is provided in top plate 100 extending entirely therethrough. Preferably, a sleeve type roller bearing 112 is press fit in central bore 110. The inside diameter of the inner race of roller bearing 112, or the inside diameter of bore 110 when a sleeve bearing is not used, is only slightly greater than the outside diameter of pin 82, so that relative rotation is permitted between the pin and sleeve bearing 112 or bore 110, as the case may be, when inserted therein, as discussed hereinafter.

Figure 5:
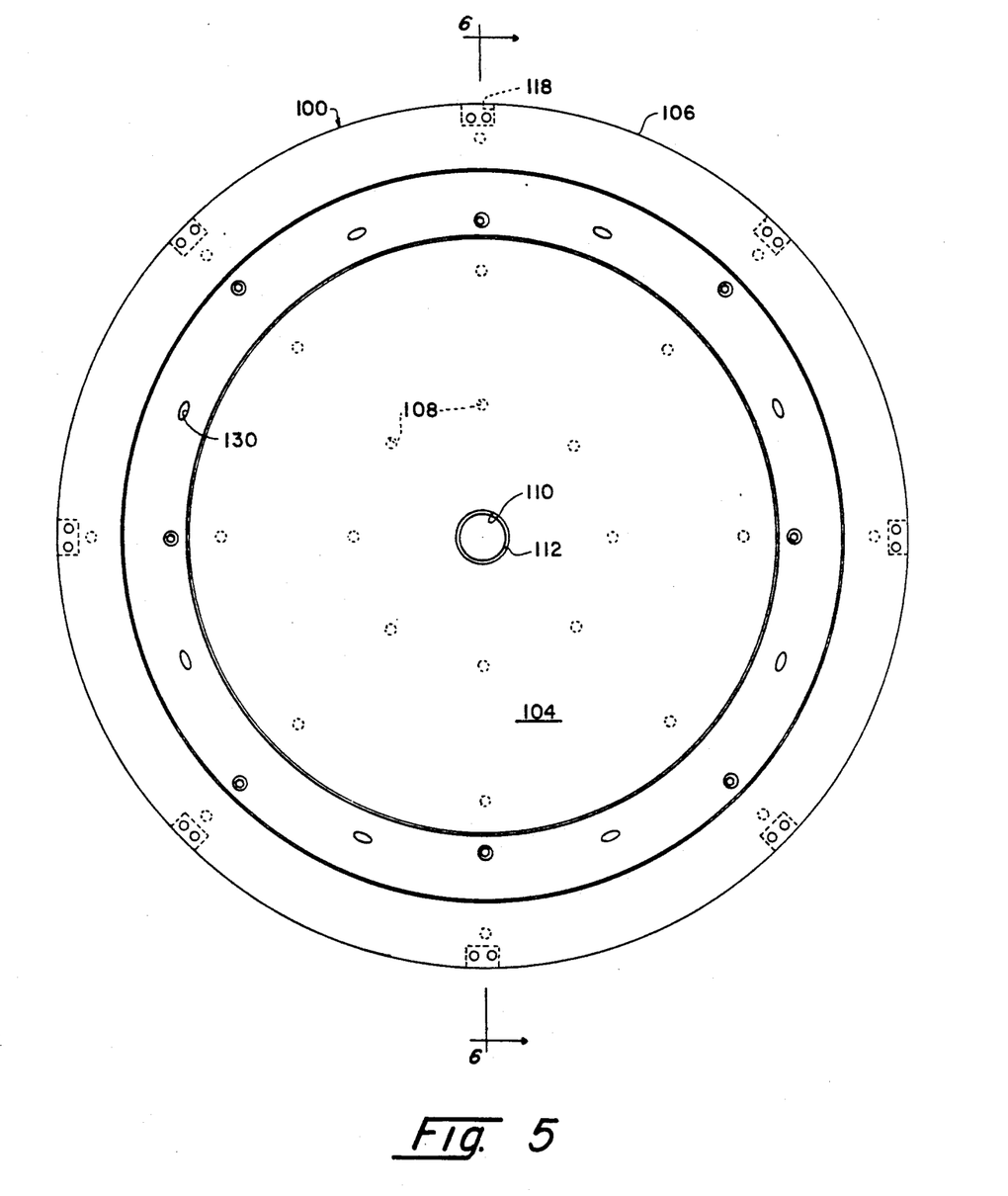
FIG. 5 is a plan view of the bottom surface of the top plate of the fixture.

Top plate 100 also comprises a plurality of notches 118 positioned adjacent and communicating with the peripheral edge 106 of the top plate. Preferably, each of the notches 118 includes a hardened seat 119 attached to the base thereof. Notches 118 are evenly distributed around the peripheral edge 106 of the top plate 100 so that each notch is spaced an equal distance from adjacent notches. The specific number of notches 118 corresponds to the number of clamps 150 used in fixture system 20, as discussed hereinafter. Alternatively, an annular groove (not shown) having a height and depth similar to that of notches 118 may be provided extending around the entire periphery of top plate 100 in place of notches 118.

Top plate 100 further includes a flat-bottomed annular groove 120 (FIG. 6) formed in bottom surface 104 of the top plate. Groove 120 is positioned in top plate 100 so that the radial distance between the center axis of the top plate and the center line of the groove is substantially equal to the radial distance between the center axis of bottom plate 40 and the center axis of each of its bores 52.

Figure 6:
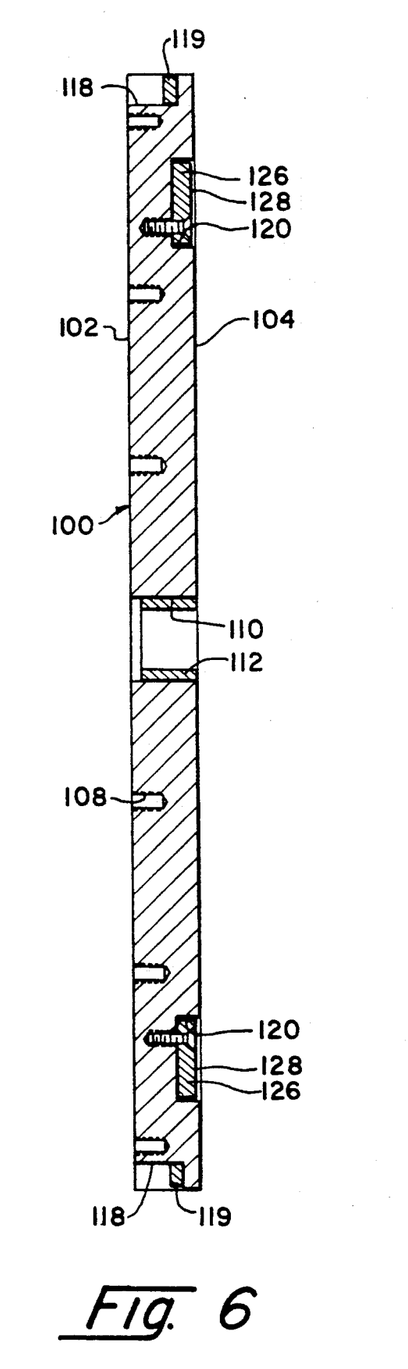
FIG. 6 is a section view of the top plate taken along line 6—6 in FIG. 5.

Top plate 100 additionally comprises a bearing seat or race 126 which is secured by known means, such as screws, in annular groove 120. Bearing seat 126 is made from a relatively hard material such as steel, and has a flat bearing surface 128. The thickness of seat 126 is selected so that bearing surface 128 is flush with bottom surface 104 of top plate 100. Bearing seat 126 preferably includes a plurality of depressions 130 (FIG. 5) formed in the bearing surface 128 thereof. Depressions 130 are radially spaced from the center of top plate 100 a distance equal to the radial spacing between the center axis of each ball bearing 66 and the center axis of bottom plate 40. Depressions 130 are sized to receive a portion of a ball bearing 66, as discussed hereinafter. The number and angular spacing of depressions 130 correspond to the number and angular spacing of bearing assemblies 60.

Referring to FIG. 1, the fixture assembly 20 of the present invention further comprises a plurality of clamps 150. Clamps 150 each include a cantilevered clamping finger 152 which reciprocates vertically between a lower clamping position and an upper released position. Clamps 150 are secured to top surface 24 of sliptable 26 adjacent the peripheral edge 106 of top plate 100 so that the clamping finger 152 of each of the clamps is radially aligned with and is positioned directly above a corresponding respective one of the notches 118 in the top plate. Of course, where notches 118 are replaced with an annular groove at the peripheral edge of the upper plate, as discussed above, clamps 150 may be positioned as desired. Fixture assembly 20 also includes a clamp control assembly 154 to which each of the clamps 150 are attached. Assembly 154 causes the fingers 152 of clamps 150 to move simultaneously between their upper released position and their lower clamping position.

Preferably, clamps 150 are hydraulic clamps of the type disclosed in U.S. Pat. No. 3,724,837, which is incorporated herein by reference. When hydraulic clamps are employed as clamps 150, clamp control assembly 154 comprises a conventional hydraulic fluid supply system which is adapted for attachment to, and is designed to activate clamps 150. When it is desired to cause fingers 152 of clamps 150 to move to the lower clamping position, the hydraulic fluid supply system is operated so that it provides hydraulic fluid to the clamps. When it is desired to cause fingers 152 of clamps 150 to move to the upper released position, the hydraulic fluid supply system is operated so that it does not provide hydraulic fluid to the clamps. Alternatively, non-hydraulic clamps may be employed as clamps 150, e.g. clamps operated manually or by pneumatic or electrical means.

In connection with the following description of the operation of the fixture assembly 20 of the present invention, reference should be made to FIGS. 1-6.

Initially, shaker table 32 is positioned so that the vibration force it generates extends horizontally, i.e., parallel to top surface 24 of sliptable 26. Then, the shaker head 30 of shaker table 26 is attached to the sliptable so that vibration forces are transmitted from the shaker table to the sliptable.

Bottom plate 40 is then bolted to threaded bores 28 in surface 24 of sliptable 26 using screws 50 mounted in apertures 48. Top plate 100 is then positioned on top of bottom plate 40 so that bottom surface 104 of the top plate confronts top surface 42 of the bottom plate and so that pin 82 is received in sleeve 112 in central bore 110 of the top plate, or in bore 110 itself when sleeve 112 is not provided. In this position, top plate 100 is maintained in predetermined, coaxial relationship with bottom plate 40, and bearing surface 128 of bearing seat 126 slidingly engages bearings 66 in bearing assemblies 60. The spring tension of spring 68 in each bearing assembly 60 is chosen so that the combined spring force of the springs 68 is sufficient to ensure that a portion of each of the ball bearings 66 projects above top surface 42 when top plate 100 is resting on the ball bearings and a test object is attached to top surface 102 of the top plate, as discussed hereinafter.

A plurality of clamps 150 is then secured to top surface 24 of sliptable 26 so that each of said plurality is positioned adjacent a corresponding respective one of the notches 118 in top plate 100. More specifically, each of the clamps 150 is positioned so that its clamping finger 152 is located directly above the notch 118 with which it is associated when the finger is in the upper released position and so that its clamping finger firmly engages the seat 119 in the notch 118 with which it is associated when the finger is in the lower clamping position. Clamps 150 are then coupled to clamp control assembly 154.

Next, a test object 22 is secured to top surface 102 of top plate 100 by conventional means. For instance, bolts (not shown) may be inserted through object 22 and threaded into threaded bores 108 in top plate 100.

Top plate 100 is then grasped by the user thereof and caused to rotate relative to bottom plate 40 until the test object is oriented in the desired position relative to the axis 34 (FIG. 1) along which the sliptable 26 is caused to vibrate. During this rotation, bearing seat 126 slides along the portions of balls 66 which project above top surface 42 of lower plate 40. Pin 82, which is sized and positioned so as to be axially and rotatably slidable in central bore 110 in top plate 100, ensures the top and bottom plates remain mutually concentrically positioned during rotation of top plate 100.

In many cases, top plate 100 will be caused to rotate until each of the balls 66 in bearing assemblies 60 are received in corresponding respective ones of depressions 130 in bearing seat 126. Bearing assemblies 60 and depressions 130 are positioned relative to one another so that this receipt occurs simultaneously for all of the balls 66. Although this receipt cannot be visually confirmed, it is possible to feel when this receipt occurs inasmuch as top plate 100 resists to some extent the rotation force applied thereto when balls 66 drop into depressions 130.

Depressions 130 are provided to facilitate vibration testing which is to be repeatedly performed along predetermined axes. For instance, where vibration tests are to be performed along axes separated by 45°, and each depression 130 is separated from adjacent depressions by 45°, the user of fixture 20 can easily determine when top plate 100 has been rotated a sufficient amount by feeling balls bearings 66 move into depressions 130. In essence, ball bearings 66 and depressions 130 provide a detent action.

Of course, vibration testing can be performed along axes other than those along which depressions 130 lie. In fact, the number of axes along which a test object 22 may be vibration tested is limited only by the precision with which the user of fixture 20 can position the top plate 100.

Clamps 150 are then caused to move to the lower clamping position by appropriate operation of clamp control assembly 154. As clamp fingers 152 move from the upper released position to the lower clamping position, a point is reached where the fingers just contact hardened inserts 119 in notches 118 in top plate 100. Further downward movement of the fingers 152 causes the latter to drive top plate 100 downwardly toward bottom plate 40 until the bottom surface 104 of the top plate contacts the top surface 42 of the bottom plate. During this downward movement of top plate 100, balls 66 are driven downwardly into the sleeves 62 in which they are received against the bias of springs 68 so that when top plate 100 engages bottom plate 40 no portion of the balls projects above top surface 42 of bottom plate 40.

Next, shaker table 32 is activated so as to generate a vibration force which is transmitted via its shaker head 30 to sliptable 26. This vibration force causes the sliptable 26, as well as fixture 20 and test object 22 attached to the fixture, to move back and forth along axis 34 (FIG. 1). After the vibration force has been applied for a selected period of time, shaker table 32 is deactivated.

Clamps 150 are then released by appropriate operation of clamp control assembly 154. As clamp fingers 152 move from the lower clamping position to the upper released position, springs 68 in bearing assemblies 60 urge balls 66 upwardly. As balls 66 move upwardly, they urge top plate 100 away from bottom plate 40. This upward movement of balls 66, and hence top plate 100, continues until clamp fingers 152 are fully released from notches 118 in the top plate.

Top plate 100 is then rotated in either a clockwise or counterclockwise direction a selected number of degrees, as discussed above. Typically, this selected number of degrees is equal to N times the angular spacing between adjacent bearing assemblies 60, where N is an integer, e.g. 1, 2, or 3. Thus, for instance, where adjacent bearing assemblies are separated by 45°, top plate 100 may be rotated clockwise 90°. Alternatively, top plate 100 may be rotated an amount that bears no relationship to the angular spacing between bearing assemblies 60. As such, test object 22 may be positioned in a relatively large number of positions relative to vibration axis 34 without detaching the test object from top plate 100.

Thereafter, clamps 150 are actuated so as to drive top plate 100 into secure engagement with bottom plate 40, as described above. The shaker table 32 is then activated and a vibration test is performed as described above.

The top plate 100 may be repeatedly released, rotated, and clamped and a vibration test may be performed after each clamping, all as set forth above.

An important advantage of the present invention is that it permits a test object to be vibration tested along multiple axes thereof which extend parallel to top surface 24 of sliptable 26. With known vibration test fixtures, the test object must be removed from the test fixture, repositioned, and reattached to the test fixture if it is desired to vibration test the object along more than two axes extending parallel to the top surface of the sliptable on which the fixture is secured. By avoiding the need to reposition the test object when it is desired to vibration test the object along more than two of its axes, the cost and time associated with vibration testing the object is typically reduced.

Certain changes may be made in the above apparatus without departing from the scope of the invention herein involved, e.g. the bearing assembly 60 may be mounted to top plate 100 and depressions 130 may be formed in bottom plate 40. Additionally, although it has been noted above that bottom plate 40 is attached directly to the top surface 24 of sliptable 26, if desired, the bottom plate may be attached to the top surface of an interface plate (not shown) which is attached to the top surface of the sliptable. Such an interface plate comprises a rectangular plate of material having parallel, flat top and bottom surfaces. When an interface plate is used, clamps 150 may be secured directly to the interface plate.

Therefore, it is intended that all matter contained in the above description or shown in the accompanying drawing shall be interpreted in an illustrative and not in a limiting sense.

What is claimed is:

1. A vibration test fixture comprising:
   a top plate having top and bottom surfaces and means for use in securing a test object to said top surface;
   a fixed bottom plate having top and bottom surfaces, said bottom plate being positioned adjacent said top plate so that said top surface of said bottom plate confronts said bottom surface of said top plate, said bottom plate being rotatively coupled to said top plate in coaxial relation therewith;

yieldable bearing means comprising a plurality of bearings and bearing seats, said bearings being located in one of said top or bottom plates and the bearing seats being located in the other of said top or bottom plates, means normally biasing said bearings and bearing seats towards one another so that when in registration with one another a predetermined detent function is performed, said biasing means further permitting rotational support of said top plate in spaced relation to said bottom plate except when said top plate is urged toward said bottom plate with a predetermined force which exceeds said normal biasing force; and clamp means for selectively applying said predetermined force to said top plate so as to cause said bottom surface of said top plate to engage said top surface of said bottom plate and said bearings to be seated in said bearing seats.

2. A fixture according to claim 1 wherein said bearing seats are in the form of a bearing race slidably engaging said bearing means.

3. A fixture according to claim 2 wherein said bearing race comprises a plurality of mutually spaced depressions which are spaced a predetermined distance radially from the center axis of said top plate.

4. A fixture according to claim 1 wherein said means for use in securing a test object comprises a plurality of threaded bores in said top plate.

5. A fixture according to claim 1 wherein said top plate has a cylindrical edge surface and a plurality of notches positioned adjacent said edge surface.

6. A fixture according to claim 5 wherein each of said notches comprises a hardened seat.

7. A fixture according to claim 1 wherein said top and bottom surfaces of said top plate are flat and parallel, and further wherein said top plate has a circular configuration.

8. A fixture according to claim 1 wherein said top plate has a central hole, and said bottom plate comprises a pin which projects from its said top surface received into said central hole, said central hole and pin being sized so that said top plate is rotatable and can also move axially relative to said bottom plate.

9. A vibration test fixture comprising:
a top plate having top and bottom surfaces and means for use in securing a test object to said top surface;
a fixed bottom plate having top and bottom surfaces, said bottom plate being positioned adjacent said top plate so that said top surface of said bottom plate confronts said bottom surface of said top plate, said bottom plate being rotatively coupled to said top plate in coaxial relation therewith;
yieldable bearing means positioned between said top and bottom plates for rotatively supporting said top plate in spaced relation to said bottom plate except when said top plate is urged toward said bottom plate with a predetermined force; and
clamp means for selectively applying said predetermined force to said top plate so as to cause said bottom surface of said top plate to engage said top surface of said bottom plate;
said yieldable bearing means comprising a plurality of ball bearing assemblies each of which comprises a housing, a ball mounted in said housing and a spring in said housing adapted to urge said ball upwardly so that a portion of said ball may project above said top surface of said bottom plate under the bias of said spring.

10. A fixture according to claim 9 wherein said springs are selected so that the combined bias executed by all of said springs on said balls is less than said predetermined force.

11. A fixture according to claim 9 wherein each of said plurality of ball bearing assemblies (a) is spaced a predetermined angular distance from each adjacent bearing assembly and (b) is spaced a predetermined radial distance from the center axis of said bottom plate.

12. A fixture according to claim 11 wherein said bottom surface of said top plate comprises a bearing race positioned to slidably engage said bearing means, said bearing race having a plurality of depressions, each of said depressions being positioned to confront a corresponding respective one of said plurality of bearing assemblies.

13. A fixture according to claim 1 wherein said clamp means comprises a plurality of clamps each having a clamping finger which is movable between a clamping position and a released position but which does not require disassembly thereof to attain the released position.

14. A fixture according to claim 13 wherein said of said clamps is positioned so that when said clamping fingers are in said clamping position they cause said top plate to grip said bottom plate and when said clamping fingers are in said released position they permit said bearing means to support said top plate in spaced and rotatable relation to said bottom plate.

15. A vibration test fixture comprising:
a top plate having top and bottom surfaces and means for use in securing a test object to said top surface;
a fixed bottom plate having top and bottom surfaces, said bottom plate being positioned adjacent said top plate so that said top surface of said bottom plate confronts said bottom surface of said top plate, said bottom plate being rotatively coupled to said top plate in coaxial relation therewith;
yieldable bearing means positioned between said top and bottom plates for rotatively supporting said top plate in spaced relation to said bottom plate except when said top plate is urged toward said bottom plate with a predetermined force; and
clamp means for selectively applying said predetermined force to said top plate so as to cause said bottom surface of said top plate to engage said top surface of said bottom plate;
said top plate comprising a peripheral edge, and wherein said clamp means comprises a plurality of clamps, each having a clamping finger which is sized to be received in one of said notches, each of said clamps being positioned adjacent a corresponding respective one of said notches so that said clamping finger of said each clamp is receivable in said notch.

16. A fixture according to claim 13 wherein said clamp means comprises control means for selectively causing said clamping fingers to move between said clamping position and said released position.

17. A vibration test assembly comprising:
a top plate having top and bottom surfaces, and means for use in securing a test object to said top surface;
a bottom plate having top and bottom surfaces, said bottom plate being positioned adjacent said top plate so that said top surface of said bottom plate lies juxtaposed to said bottom surface of said top plate in coaxial relation therewith;

yieldable bearing means comprising a plurality of bearings and bearing seats, said bearings being located in one of said top or bottom plates and the bearing seats being located in the other of said top or bottom plates, means normally biasing said bearings and bearing seats towards one another so that when in registration with one another a preposition detent function is performed, said biasing means further permitting rotatable support of said top plate in spaced relation to said bottom plate except when said top plate is urged toward said bottom plate with a predetermined force which exceeds said normal biasing force;

clamp means for selectively applying said predetermined force to said top plate so as to cause said bottom surface of said top plate to engage said top surface of said bottom plate and said bearings to be seated in said bearing seats; and vibration source means coupled to said bottom plate for providing a vibration force to said bottom plate.

18. An assembly according to claim 17 wherein said vibration source means comprises a sliptable having a top surface and a shaker table coupled to said sliptable so as to cause said sliptable to move back and forth along an axis extending parallel to said top surface of said sliptable.

19. A vibration test fixture comprising:
a top plate having top and bottom surfaces, and means for use in securing a test object to said top surface;
a bottom plate having top and bottom surfaces, said bottom plate being positioned adjacent said top plates so that said top surface of said bottom plate lies juxtaposed to said bottom surface of said top plate; and
yieldable bearing means comprising a plurality of bearings and bearing seats, said bearings being located in one of said top or bottom plates and the bearing seats being located in the other of said top or bottom plates, means normally biasing said bearings and bearing seats towards one another so that when in registration with one another a preposition detent function is performed, said biasing means further permitting rotatable movement of said top plate in spaced relation to said bottom plate except when said top plate is urged toward said bottom plate with a predetermined force, said bottom plate additionally comprising means for securing said bottom plate to the top surface of a sliptable.

20. A fixture according to claim 19 wherein said top plate comprises a central bore and said bottom plate comprises a pin which projects from its top surface, and further wherein said pin is sized to be received with an axially and radially sliding fit in said central bore of said top plate, wherein said top plate can move axially with respect to said bottom plate.

21. A vibration test fixture comprising:
a top plate having top and bottom surfaces, and more for use in securing a test object to said top surface;
a bottom plate having top and bottom surfaces, said bottom plate being positioned adjacent said top plate so that said top surface of said bottom plate confronts said bottom surface of said top plate;
yieldable bearing means positioned between said top and bottom plates for rotatively supporting said top plate in spaced relation to said bottom plate except when said top plate is urged toward said bottom plate with a predetermined force; and
said bottom plate additionally comprising means for securing said bottom plate to the top surface of a sliptable;
said bearing means comprising a plurality of bearing assemblies each of which comprises a housing, a ball mounted in said housing, and a spring in said housing adapted to urge said ball upwardly so that a portion of said ball projects above said top surface of said bottom plate under the bias of said spring.

22. A fixture according to claim 21 wherein said top plate comprises a bearing race positioned to slidably engage said bearing assemblies, said bearing race having a plurality of depressions positioned to confront a corresponding respective one of said plurality of bearing assemblies.

* * * * *

UNITED STATES PATENT AND TRADEMARK OFFICE
CERTIFICATE OF CORRECTION

PATENT NO. : 5083463
DATED : January 28, 1992
INVENTOR(S) : Philip Marshall et al It is certified that error appears in the above-identified patent and that said Letters Patent is hereby corrected as shown below:

Claim 14, column 10, line 26, the word "said" should be -- each --;

Claim 17, column 11, line 3, after the word "plate", add the phrase -- , said bottom plate being rotatively coupled to said top plate --; and Claim 21, column 12, line 17, the word "more" should be -- means --.

Signed and Sealed this

Twenty-eighth Day of September, 1993

Attest:

BRUCE LEHMAN

Attesting Officer

Commissioner of Patents and Trademarks